United States Patent [19]

Hoff

[11] 4,104,199

[45] Aug. 1, 1978

[54] CATALYST FOR THE POLYMERIZATION OF ETHYLENE OR MIXTURES OF ETHYLENE WITH TERMINAL OLEFINS

[75] Inventor: Glen R. Hoff, Naperville, Ill.

[73] Assignee: Standard Oil Company a corporation of Indiana, Chicago, Ill.

[21] Appl. No.: 790,194

[22] Filed: Apr. 25, 1977

Related U.S. Application Data

[63] Continuation-in-part of Ser. No. 645,708, Dec. 31, 1975, abandoned.

[51] Int. Cl.$^2$ .............................. C08F 4/64; C08F 4/16
[52] U.S. Cl. ................................ 252/430; 252/429 C; 526/121
[58] Field of Search ........................... 252/429 C, 430

[56] References Cited

U.S. PATENT DOCUMENTS

| | | | |
|---|---|---|---|
| 3,303,181 | 2/1967 | Bloyaert | 252/429 C |
| 3,449,263 | 6/1969 | Watt | 252/429 C |
| 3,809,657 | 5/1974 | Moeller-Tamm et al. | 252/429 C |

*Primary Examiner*—Patrick P. Garvin
*Attorney, Agent, or Firm*—Stanley L. Hensley; Arthur G. Gilkes; William T. McClain

[57] ABSTRACT

A novel supported catalyst for polymerization of ethylene or its mixtures with $C_3$ to $C_8$ terminal olefins composed of (a) the solid reaction product of a titanium (IV) or vanadium (V) alkoxide, a hydrated magnesium stannate and an alkylaluminum dichloride, and (b) an organo-aluminum compound promoter. The catalyst produces polyolefin in good yield without any substantial production of polymer fines and the catalyst is quite sensitive to hydrogen induced chain termination processes leading to improved molecular weight control and rheology of the polymer product.

7 Claims, No Drawings

CATALYST FOR THE POLYMERIZATION OF ETHYLENE OR MIXTURES OF ETHYLENE WITH TERMINAL OLEFINS

RELATED APPLICATIONS

This application is a continuation-in-part of copending application Ser. No. 645,708, filed Dec. 31, 1975, now abandoned.

SUMMARY OF THE INVENTION

This invention relates to a novel supported catalyst and a process for the use thereof for the polymerization of ethylene or its mixtures with $C_3$ to $C_8$ terminal olefins and, more specifically, the invention relates to a novel supported catalyst and process for the use thereof for the polymerization of ethylene or ethylene-dominated terminal olefin mixtures which is useful in slurry or vapor phase polymerization and in which substantial yields of large particle size, broader molecular weight, high density polyethylenes are obtained.

In accordance with the instant invention, ethylene or ethylene with up to about twenty mol percent of a $C_3$ to $C_8$ alpha-olefin is polymerized to normally solid polymers at low to medium pressures and moderate temperatures by contacting the olefin or mixture of olefins with a supported catalyst system comprising (a) the solid reaction product of a lower alkyl titanium (IV) or vanadium (V) alkoxide, a hydrated magnesium stannate and an alkylaluminum dichloride and, (b) an organoaluminum compound promoter. Polymer produced using the instant catalyst can be formed in yields of up to about 10,000 grams of polymer per gram of solid catalyst component or more in an hour at about 200 p.s.i.g. ethylene pressure and the catalyst is sufficiently versatile to be used effectively in slurry or vapor phase polymerization processes. When compared to many other supported, magnesium-based transition metal catalysts, it produces polymer of broader molecular weight distribution and the as-formed polymer particle size is such that the as-formed polymer is generally about the size of rice grains.

BACKGROUND OF THE INVENTION

A number of support materials have been suggested for improving ethylene polymerization catalysts made from transition metal compounds promoted by an alkylaluminum compound. Foremost among these are supports containing magnesium. Recently, in British Pat. No. 1,392,099 dried magnesium hexahydroxstannates have been disclosed as carriers for transition metals to form catalyst components which are promoted by aluminum alkyls. The problem with such catalyst component is that although they are alleged to be of excellent yield, preparation can be expensive due to large amounts of transition metal compound and preparation media being required. Additionally, the catalyst components do not produce polymer of a broad molecular weight over a substantially wide range of hydrogen partial pressures. A broad and controllable molecular weight distribution is important to obtain products with a wide range of utilities and the large particle size of the polymer produced in the instant invention is important in product handling and can be particularly important in certain forms of vapor state polymerization.

Now it has been found that good yields of high density polyethylenes and related materials can be obtained at moderate temperatures and pressures by using the solid reaction product of (a) a hydrated magnesium stannate, a lower alkyl titanium (IV) or vanadium (V) alkoxide and an alkylaluminum dichloride and, (b) an aluminum alkyl compound promoter while obtaining a polymer product having a broad and controllable molecular weight distribution and large average particle size.

STATEMENT OF THE INVENTION

One starting material of the solid catalyst component of the instant invention is a hydrated magnesium stannate and, preferably, magnesium stannate with about one to four water molecules of hydration. More preferably, the material is $MgSnO_3 \cdot 3H_2O$.

The hydrated magnesium stannate is reacted with the lower alkyl titanium (IV) or vanadium (V) alkoxide to form a supported titanium or vanadium compound. This reaction is effected by admixing the transition metal compound neat or in an inert reaction medium with the hydrated magnesium stannate. More preferably, the transition metal ester is reacted with the hydrated magnesium stannate by combining it at least partially dissolved in an inert reaction medium.

Thereafter, the product of the reaction of the stannate with the transition element compound can be treated, generally, in an inert medium with a lower alkyl, alkylaluminum dichloride. More preferably, an alkylaluminum dichloride is used in which the alkyl group contains between 1 and about 6 carbon atoms.

Preferably, any substantially inert liquid such as a hydrocarbon in which the product is substantially insoluble can be employed. Such media are saturated hydrocarbons such as hexane, heptane, octane, etc., aromatic hydrocarbons such as benzene and toluene, etc., and halogenated hydrocarbons such as chlorobenzene, etc. It is important, for best results that the reaction medium be free of traces of moisture, oxygen, carbon dioxide and polar organic compounds, so prior to use, it should be percolated through silica gel or molecular sieves, or both.

The temperature of the reaction between the transition metal compound and the stannate is preferably beween about 25° to about 150° C. More preferably, the temperature range used is between about 25° and about 80° C. and, most preferably, a reaction temperature between about 25° and about 50° C. is used.

The reaction temperature of the alkylaluminum dichloride and the reaction product of the hydrated stannate and the Periodic Group IVB or VB compound is preferably between about 20° and about 100° C. and, more preferably between about 20° and about 60° C.

The transition metal compound-hydrated magnesium stannate reaction time preferably is between about one-half hour and about 24 hours, more preferably, between about 3 hours and about 20 hours and, most preferably, between about 4 and about 18 hours.

The alkylaluminum dichloride is preferably reacted with the reaction product of the hydrated stannate and the transition metal compound for a time between about 10 minutes and about 4 hours and, more preferably, between about 30 minutes and 3 hours.

Preferably, any lower alkyl alkoxide of titanium (IV) or vanadium (V) can be used. More preferably, a titanium (IV) alkoxide is used. In these compounds, the alkoxide moiety contains an alkyl group of from one to about six carbon atoms. It can sometimes be advantageous to incorporate a small amount of Zr (IV) in the solid catalyst component by utilizing, e.g., a zirconium (IV) alkoxide during the preparation.

Preferably, the amount of transition metal compound used for reaction with the hydrated stannate is larger than a weight ratio of about one-tenth. A weight ratio of between about two-tenths and about five is more preferable and, most preferably, a weight ratio of between about four-tenths and two is employed. By weight ratio is meant the weight of transition metal compound employed divided by the weight of hydrated magnesium stannate used.

The amount of alkylaluminum dichloride employed is preferably between about 2 and 30 weights per weight of transition metal compound employed and, more preferably, between about five and twenty-five weights per weight. In general, use of too much alkylaluminum dichloride is not deleterious to the effectiveness of the catalyst.

Preferably, the hydrated magnesium stannate and the transition metal compound are first reacted following by treatment with the alkylaluminum compound. However, the three components can be reacted in a single step with good results. Other modes can result in poorer catalysts.

The chemical form of the transition metal compound in the solid catalyst component is unknown but, since it appears impossible to remove it completely with solvent, it is probably at least in part chemically linked to the substrate. Since the chemical form of the titanium or vanadium compound on the surface of the carrier is unknown it may or may not exhibit, depending upon the transition metal ester used, halide and/or alkoxy linkages.

The amount of transition element compound combined in the solid catalyst component is relatively small generally being in the range of about one-tenth to about 15 percent, calculated as the element, of the total weight of the solid catalyst component. More preferably, it is about one-half to about 5 weight percent. Other things being equal, the more transition element combined in the solid catalyst component, the more active in terms of yield the component becomes.

Use of the above solid catalyst component for the polymerization of olefins is accompanied by the use of a promoter which is preferably a lower alkyl organoaluminum compound such as trialkyl aluminum, a dialkylaluminum halide or dialkylaluminum hydride or a combination thereof. More preferably, a trialkylaluminum or dialkylaluminum hydride is used. Most preferably, a trialkylaluminum is the promoter used. By lower alkyl here is meant a hydrocarbon radical containing 1 to about 6 carbon atoms. For best results with average purity polymerization media, part of the promoter added is used to pretreat the polymerization medium. The remaining amount is then added as a mixture together with the solid catalyst component.

Preferably, the ratio of total millimols of promoter used to grams of solid catalyst component should be at least about 2:1. More preferably, it is at least about 10:1 and, most preferably, it is at least about 25:1. This ratio depends upon polymerization temperature and the type of polymerization somewhat, for example, increasing as polymerization temperature decreases and decreasing for vapor state polymerization. The ratio can also depend upon polymerization medium purity and the amount of such medium which is employed.

The promoted solid catalyst component (catalyst) described above can be used in particle form polymerization or in a solventless process wherein the olefin is polymerized directly from the vapor phase. The polymerization temperature using a solventless process should be large enough to give an adequate polymerization rate but not too large to raise the pressure above that which is normally used in this type of process, i.e., up to about several hundred p.s.i.g. or soften the polymer bed contained in the reactor.

In the particle form or slurry process, the polymerization is carried out at a temperature such that the polymer as formed is a solid in the polymerization reactor. The preferred polymerization temperature is about 40° to about 110° C. In a vapor phase process wherein little or no liquid medium is used, the preferred temperature range is about 40° to about 130° C. and, more preferably, from about 60° to about 120° C.

Whereas the preferred olefin to be polymerized is ethylene, it is found that the catalyst is useful for the polymerization of ethylene in mixture with up to about twenty mol percent of other terminal olefins such as propylene, butene-1, pentene-1, etc. and dienes such as butadiene and isoprene, etc.

It is of particular importance for best results that the olefin, for example ethylene, be substantially free of catalyst poisons. Thus, it is preferred to use polymerization grade olefin and to pass it through a molecular sieve prior to use to remove the remaining traces of moisture, oxygen, carbon dioxide and polar organic compounds.

The organic liquid employed as the polymerization medium in the particle form process can be an aliphatic alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene or a halogenated aromatic compound such as chlorobenzene, chloronaphthalene or orthodichlorobenzene. The nature of the medium is subject to considerable variation, although the medium employed should be liquid under the conditions of reaction and relatively inert. Other media which can be used include ethylbenzenes, isopropylbenzene, ethyltoluene, n-propylbenzene, diethylbenzenes, mono- and dialkylnaphthalenes, n-octane, isooctane and methylcyclohexane. Preferably, a hexane or a butane is employed.

The polymerization media employed in particle form polymerization should be purified for best results from traces of moisture, oxygen, carbon dioxide and polar organic compounds prior to use by contacting the medium, for example, in a distillation procedure, with an organoaluminum compound, for example, triethylaluminum, prior to or after percolating the medium through silica gel or molecular sieves.

The polymerization time is not critical and will usually be of the order of thirty minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to several hours since a cyclic system can be employed by return of the polymerization medium, if used, and excess monomer to the charging zone wherein the catalyst can be replenished and additional monomer introduced.

Preferably, the total pressure range for the polymerization process is about atmospheric to over 1000 p.s.i.g. More preferably, the polymerization pressure is greater than about 100 p.s.i.g. and, most preferably, the polymerization pressure is about 200 p.s.i.g. or larger. The polymerization yield depends upon the olefin pressure and substantial increases in yields have been noticed by raising the pressure over about 100 p.s.i.g.

The novel catalyst combination of this invention when employed for the polymerization of olefins is used with hydrogen to control molecular weight. Solid polymers having molecular weights greater than about 50,000 and less than about 3,000,000 result thereby. The amount of hydrogen to be used depends upon the molecular weight distribution to be obtained and can be easily determined by those skilled in the art based on the Examples appended below.

The polyolefins prepared in accordance with this invention can be extruded, mechanically melted, cast or molded as desired. They can be used to form plates, sheets, films or a variety of molded objects.

While the invention is described in connection with the specific examples below, it is to be understood that these are for illustrative purposes only. Many alternatives, modifications and variations will be apparent to those skilled in the art in the light of the below examples and such alternatives, modifications and variations fall within the scope and spirit of the appended claims.

EXAMPLE I

A mixture of 1.7 grams of hydrated megnesium stannate, 2 milliliters of titanium tetrachloride and 70 milliliters of nonane was heated at reflux temperature for 18 hours. After the mixture had cooled, 28 milliliters of an ethylaluminum dichloride solution (25 percent in hexane) was added and then the mixture was heated at 69° C. one hour. The resulting slurry contained the solid catalyst component and aliquot portions of the slurry were used for polymerization without further treatment.

EXAMPLE II

A mixture of 3 grams of hydrated magnesium stannate, 0.7 milliliters of titanium tetrachloride, and 70 milliliters of nonane was heated at reflux temperature for 18 hours. After the mixture had cooled 50 milliliters of an ethylaluminum dichloride solution (25 percent in hexane) was added and the mixture was heated at 69° C. for one hour. The resulting slurry contained the solid catalyst component and aliquot portions of the slurry were used for polymerization without further treatment.

EXAMPLE III

A mixture of 3.5 grams of hydrated magnesium stannate, 2.5 milliliters of tetrabutoxytitanium (IV), and 100 milliliters of nonane was heated at reflux temperature 16 hours. After the mixture had cooled 58 milliliters of a 25 percent ethylaluminum dichloride solution in hexane was added and the mixture heated at 69° C. for one hour. The resulting slurry contained the solid catalyst component and aliquot portions of the slurry were used for polymerization without further treatment.

EXAMPLE IV

A mixture of 4.0 grams of hydrated magnesium stannate, 4.6 milliliters of titanium tetrachloride, 20 milliliters of hexane, and 66 milliliters of 25 percent ethylaluminum dichloride in hexane solution was heated at reflux temperature for one hour. The resulting slurry was used as is in aliquot portions for polymerization.

EXAMPLE V

Polymerization grade ethylene was polymerized at 82° C. for one hour in 500 milliliter stirred autoclave which was evacuated, charged with ethylene and hydrogen, and 225 milliliters of purified hexane, 20 milligrams of triethylaluminum dissolved in one milliliter of hexane and the amounts of solid catalyst components added as shown below. An additional 20 milligrams of triethylaluminum was added in each polymerization with the solid catalyst component used for a total of 40 milligrams. Ethylene was fed on demand.

TABLE

| Catalyst Component | Amount (milligrams) | Hydrogen (p.s.i.g.) | Yield (grams) | Melt** Index | $MF_{10}/MF_1$ |
|---|---|---|---|---|---|
| Example I | 8.7 | 80 | 51.4 | 0.20 | 53.0 |
| Example I | 8.7 | 140 | 35.3 | 0.16 | 53.8 |
| Example I | 13.0 | 160 | 27.4 | 0.45 | 46.6 |
| Example II | 13.6 | 80 | 11.5 | 0.44 | 42 |
| Example III | 15.0 | 100 | 20.4 | 0.32 | 36 |
| Example I | 10.1 | 160 | 30.1 | 0.26 | 80 |
| Example I | 10.1 | 180 | 35.7 | 0.81 | 50 |
| Example I | 15.1 | 200 | 22.8 | 4.3 | 55 |
| Example IV* | 10.9 | 160 | 46.1 | 0.01 | — |

*The melt index is unusually low for this product probably as a result of an unknown deviation in polymerization procedure.
**Determined according to ASTM 1238.

COMPARATIVE EXAMPLE VI

A mixture of 7.85 grams of hydrated magnesium stannate, 6.0 milliliters of a tetrabutoxytitanium (IV), and 200 milliliters of hexane was heated at reflux temperature one hour. The resulting slurry contained the solid catalyst component and aliquot portions were combined with 100 milligrams of triethylaluminum and used in a polymerization reactor.

EXAMPLE VII

To the slurry of Example VI, which contained the solid catalyst component, was added 58 milliliters of a 50 weight percent solution of ethylaluminum dichloride in hexane. The mixture was heated at the reflux temperature one hour. The resulting slurry contained the active catalyst component and aliquot portions were combined with 100 milligrams of triethylaluminum and used for polymerization.

COMPARATIVE EXAMPLE VIII

A mixture of 9.39 grams of hydrated magnesium stannate, 9 milliliters of tetraethoxytitanium (IV), and 125 milliliters hexane was heated at the reflux temperature one hour. The resulting slurry contained the solid catalyst component and aliquot portions were combined with 100 milligrams of triethylaluminum and used in a polymerization reactor.

EXAMPLE IX

To the slurry of Example VIII was added 75 milliliters of a 50 weight percent solution of ethylaluminum dichloride in hexane and the mixture heated at the reflux temperature one hour. The resulting slurry contained the active solid catalyst component and aliquot portions were combined with 100 milligrams of triethylaluminum and used for polymerization.

EXAMPLE X

The catalyst slurry of Example IX was combined with 70 milliliters of a 50 weight percent solution of ethylaluminum dichloride in hexane and the mixture heated one hour at reflux temperature. The resultant slurry contained the active solid catalyst component and aliquot portions were combined with 100 milligrams of triethylaluminum and used for polymerization.

COMPARATIVE EXAMPLE XI

A mixture of 8.43 grams of hydrated magnesium stannate, 9.0 milliliters of tetraethoxytitanium (IV), and 80 milliliters nonane was heated at the reflex temperature 18 hours. After the mixture cooled, 40 milliliters of hexane were added and the aliquots of the resultant slurry, containing a solid catalyst component, were combined with 100 milligrams of triethylaluminum and used in a polymerization reactor.

EXAMPLE XII

The slurry of Example XI was combined with 150 milliliters of a 50 weight percent solution of ethylaluminum dichloride in hexane and the mixture heated at reflux temperature one hour. The resultant slurry contained the active solid catalyst component and aliquot portions were combined with 100 milligrams of triethylaluminum and used for polymerization.

EXAMPLE XIII

Polymerizations were effected using the procedure of Example V and the catalysts of Example VII through XII. The results are shown in the Table below.

TABLE

| Catalyst Component | Amount (milligrams) | Hydrogen (psig) | Yield (grams) | Melt Index |
|---|---|---|---|---|
| Example VI | 22.8 | 120 | 0 | — |
| Example VII | 23.4 | 120 | 37.0 | 3.3 |
| Example VIII | 11.0 | 120 | 0 | — |
| Example IX | 22.6 | 120 | 48.2 | 0.8 |
| Example X | 13.9 | 120 | 29.2 | 0.8 |
| Example XI | 23.2 | 100 | 1.9 | — |
| Example XII | 12.9 | 120 | 17.4 | 0.7 |

What is claimed is:

1. A catalyst for polymerizing ethylene or ethylene containing up to about twenty mol percent of another polymerizable terminal olefin comprising:
   (a) a solid catalyst component which is the reaction product of (1) hydrated magnesium stannate, (2) a lower alkyl titanium (IV) or vanadium (V) alkoxide, and (3) a lower alkyl alkylaluminum dichloride, wherein the weight ratio of (2) to (1) ranges from about 0.1 to about 5 and the weight ratio of (3) to (2) ranges from about 2 to about 30, said reaction comprising a step wherein at least (1) and (2) are reacted at a temperature ranging from about 25° to about 150° C; and
   (b) a lower alkyl organoaluminum compound selected from the group consisting of trialkylaluminum, dialkylaluminum hydrides, dialkylaluminum halides and mixtures thereof in an amount, exceeding about 2 millimols per gram of solid catalyst component, said amount being effective to promote the activity of the solid catalyst component.

2. The catalyst of claim 1 wherein the solid catalyst component is the product of the reaction of components (1) and (2) followed by reaction with component (3) at a temperature ranging from about 20° to about 100° C.

3. The catalyst of claim 2 wherein said organoaluminum compound is a lower alkyl trialkylaluminum.

4. The catalyst of claim 3 wherein said hydrated magnesium stannate contains between about one and four water molecules of hydration.

5. The catalyst of claim 4 wherein said lower alkyl titanium (IV) or vanadium (V) alkoxide is a lower alkyl titanium (IV) alkoxide.

6. The catalyst of claim 5 wherein the weight ratio of the lower alkyl titanium (IV) alkoxide to the hydrated magnesium stannate ranges from about 0.4 to about 2 and the weight ratio of the lower alkyl alkylaluminum dichloride to the lower alkyl titanium (IV) alkoxide ranges from about 5 to about 25.

7. The catalyst according to claim 6 wherein the lower alkyl titanium (IV) alkoxide is tetrabutoxy titanium (IV), the hydrated magnesium stannate has three water molecules of hydration, the lower alkyl alkylaluminum dichloride is ethylaluminum dichloride, and the organoaluminum compound is triethylaluminum.

* * * * *